US008989790B2

(12) United States Patent
Todoroki

(10) Patent No.: US 8,989,790 B2
(45) Date of Patent: Mar. 24, 2015

(54) WIRELESS COMMUNICATION DEVICE AND WIRELESS COMMUNICATION METHOD

(75) Inventor: Toshiya Todoroki, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 109 days.

(21) Appl. No.: 13/394,157

(22) PCT Filed: Sep. 2, 2010

(86) PCT No.: PCT/JP2010/065455
§ 371 (c)(1),
(2), (4) Date: Mar. 5, 2012

(87) PCT Pub. No.: WO2011/030803
PCT Pub. Date: Mar. 17, 2011

(65) Prior Publication Data
US 2012/0163485 A1    Jun. 28, 2012

(30) Foreign Application Priority Data
Sep. 9, 2009    (JP) .................................. 2009-208040

(51) Int. Cl.
*H04B 7/00*     (2006.01)
*H04B 7/04*     (2006.01)
*H04L 5/00*     (2006.01)
*H04W 16/28*    (2009.01)

(52) U.S. Cl.
CPC ............ *H04B 7/0413* (2013.01); *H04L 5/0023* (2013.01); *H04W 16/28* (2013.01)
USPC ............................ 455/517; 370/315; 370/328

(58) Field of Classification Search
None
See application file for complete search history.

(56) References Cited

U.S. PATENT DOCUMENTS 8,625,488 B1 * 1/2014 Gogate et al. ................ 370/328
2005/0042999 A1 * 2/2005 Rappaport .................... 455/307
(Continued)

FOREIGN PATENT DOCUMENTS

| JP | 2000-069149 | 3/2000 |
| JP | 2008-54268  | 3/2008 |
| JP | 2008-205904 | 9/2008 |

OTHER PUBLICATIONS

International Search Report, PCT/JP2010/065455 dated Dec. 7, 2010.

*Primary Examiner* — Ian N Moore
*Assistant Examiner* — Eric P Smith
(74) *Attorney, Agent, or Firm* — Young & Thompson

(57) ABSTRACT

A wireless communication device with MIMO function conforming to a predetermined wireless standard and communication terminals that communicate with a base station incorporating MIMO function includes a master communication terminal which is any one of the plurality of communication terminals and a slave communication terminal which is connected to the master communication terminal via a predetermined connection element and is one or more communication terminals other than the master communication terminal among the plurality of communication terminals. A configuration in which a part of or all signal processing functions that relate to transmission and reception of one or more antennas incorporated in one or more slave communication terminals can be controlled from the master communication terminal is used. A configuration in which the number of antennas can be arbitrarily increased is implemented and a protocol for call connection is performed only between the base station and the master communication terminal.

15 Claims, 3 Drawing Sheets

(56) References Cited

U.S. PATENT DOCUMENTS

| | | |
|---|---|---|
| 2007/0171852 A1* | 7/2007 | George et al. .................. 370/328 |
| 2008/0159243 A1* | 7/2008 | Rofougaran .................. 370/338 |
| 2008/0175213 A1* | 7/2008 | Hansen .......................... 370/338 |
| 2009/0310586 A1* | 12/2009 | Shatti ............................. 370/338 |
| 2010/0081381 A1* | 4/2010 | Rofougaran .................. 455/41.2 |
| 2011/0143692 A1* | 6/2011 | Sofer et al. ....................... 455/88 |
| 2013/0094439 A1* | 4/2013 | Moshfeghi .................... 370/328 |

* cited by examiner

WIRELESS COMMUNICATION DEVICE AND WIRELESS COMMUNICATION METHOD

TECHNICAL FIELD

The present invention relates to a wireless communication device and a wireless communication method.

BACKGROUND ART

MIMO (Multi-Input Multi-Output) is a technology in which different data sequences are transmitted from a plurality of antennas, respectively and in a reception side, separation of the data sequences that are simultaneously transmitted from each antenna is made possible. By this technology, a transmission rate can be improved without expanding a frequency band. MIMO is applied to for example, IEEE 802.11n standard for wireless LAN (Local Area Network), UMTS LTE standard being developed by 3GPP that is a standard for a next generation mobile communication, or mobile WiMAX standard based on IEEE 802.16e standard. In the above description, IEEE is an abbreviation of "Institute of Electrical and Electronic Engineers". 3GPP is an abbreviation of "3rd Generation Partnership Project". UMTS is an abbreviation of "Universal Mobile Telecommunication System". LTE is an abbreviation of "Long Term Evolution". WiMAX is an abbreviation of "Worldwide Interoperability for Microwave Access".

FIG. 3 is a figure for explaining the operating principle of MIMO. Two antennas T-ANT1 and T-ANT2 simultaneously transmit a data sequence A and a data sequence B, respectively. Two antennas R-ANT1 and R-ANT2 receive different sequences in which the data sequence A and the data sequence B are multiplexed, respectively. The data sequence A and the data sequence B from the two antennas T-ANT1 and T-ANT2 are separated from each other by estimating four channel variations h11(t), h12(t), h21(t), and h22(t) at the reception side. In order to make possible to uniquely identify the data sequence from each antenna and estimate the channel variations h11(t), h12(t), h21(t), and h22(t), a pilot signal is embedded in the transmission data sequence of each antenna.

Here, a configuration in which T transmission side antennas and R reception side antennas are included is denoted by T×R. For example, in the specification of LTE, as the configuration of T×R, 2×2, 4×2, and 4×4 are defined for a downlink (data transmission from a base station to a portable terminal). Namely, when the portable terminal of LTE supports MIMO, a plurality of antennas have to be installed in the portable terminal.

On the other hand, patent document 1 describes a wireless system that is composed of a mobile telephone terminal 3, a connection terminal 4 that is detachably attached to the mobile telephone terminal 3, and a portable terminal 5 that is wirelessly connected to the connection terminal 4. In this wireless system, information from the mobile telephone terminal 3 is wirelessly transmitted to the portable terminal 5 via the connection terminal 4 and the information is displayed in the portable terminal 5. On the other hand, information from the connection terminal 5 is received by the connection terminal 4 and inputted to the portable terminal 3, and the portable terminal 3 is controlled.

PRIOR ART DOCUMENT

Patent Document

[patent document 1] Japanese Patent Application Laid-Open No. 2000-069149

Non-Patent Document

[non-patent document 1] LTE specification 3GPP TS36.211 V8.5.0 FIG. 6.3-1

DISCLOSURE OF THE INVENTION

Technical Problem

As mentioned above, in order to support MIMO, a plurality of antennas have to be installed in the portable terminal. However, in case of the portable terminal, there is a limitation in which the size of the portable terminal cannot be made large in order to maintain portability. Accordingly, there is a risk in which if a plurality of antennas, specifically, four antennas are incorporated in the portable terminal, its size becomes large.

Further, when the free space wavelength of the frequency that is used is $\lambda_0$, in order to ensure a desired performance, the antennas have to be separated from each other by more than $\lambda_0/2$. Therefore, for example, when the four built-in antennas are used for the portable terminal while satisfying this condition, the size of the portable terminal has to be made further large.

Moreover, some of the current portable terminals support a plurality of wireless systems and in many cases, a plurality of antennas are already incorporated in these portable terminals. Accordingly, it is further difficult to additionally incorporate the antenna for supporting MIMO.

Even if the antenna for supporting MIMO can be additionally incorporated, it is difficult to arbitrarily increase the number of antennas for upgrade of the MIMO specification (for example, a change from 2×2 to 4×4). As an example of a solution, a structure in which an external antenna is attached to the portable terminal can be used. However, in this case, there is a risk in which appearance becomes unattractive and a design problem occurs.

On the other hand, even when the mobile telephone terminal 3 is kept in a bag or the like, the mobile telephone terminal 3 can be operated by the portable terminal 5 when the invention disclosed in patent document 1 is used. However, the technology described in patent document 1 cannot solve the above-mentioned problem of the addition of the antenna.

An object of the present invention is to provide a wireless communication device with which the reliability of the transmission data can be improved and the high transmission rate can be realized without newly adding an antenna and a wireless communication method.

Technical Solution

A wireless communication device of the present invention which has a MIMO (Multi-Input Multi-Output) function conforming to a predetermined wireless standard and includes a plurality of communication terminals that can communicate with a base station incorporating the MIMO function includes a master communication terminal that is any one of the plurality of communication terminals and slave communication terminals that are connected to the master communication terminal via predetermined connection means and are one or more communication terminals other than the master communication terminal among the plurality of communication terminals, wherein a configuration in which a part of or all signal processing functions that relate to transmission and reception of one or more antennas that are incorporated in the one or more slave communication terminals can be controlled from the master communication terminal is used and whereby, a configuration in which the number of antennas can be arbitrarily increased is implemented and a protocol for call connection is used only between the base station and the master communication terminal.

A wireless communication method of the present invention is a wireless communication method for a wireless communication device which has a MIMO function conforming to a predetermined wireless standard and includes a plurality of communication terminals that can communicate with a base station incorporating the MIMO function. In the wireless communication method, any one of the plurality of communication terminals is designated as a master communication terminal, the communication terminals other than the master communication terminal among the plurality of communication terminals are designated as slave communication terminals, the master communication terminal is connected to the slave communication terminals via predetermined connection means, and a configuration in which a part of or all signal processing functions that relate to transmission and reception of one or more antennas incorporated in the one or more slave communication terminals can be controlled from the master communication terminal is used, and whereby, a configuration in which the number of antennas can be arbitrarily increased is implemented and a protocol for call connection is used only between the base station and the master communication terminal.

Advantageous Effect of the Invention

By using the present invention, the reliability of the transmission and reception data can be further improved or the high transmission rate can be realized without adding the antenna.

BEST MODE FOR CARRYING OUT THE INVENTION

First Exemplary Embodiment

Figure 1:
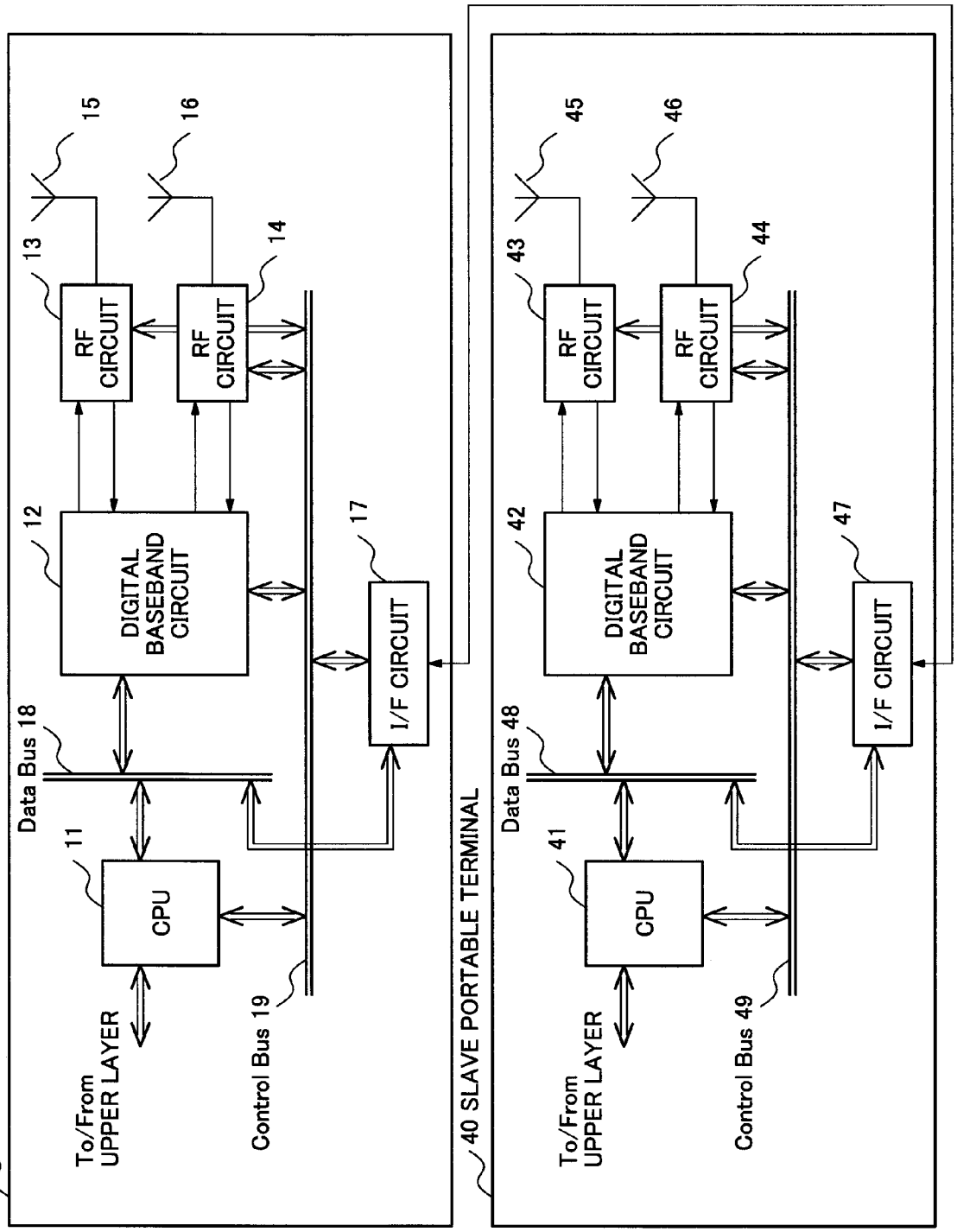
FIG. 1 is a block diagram showing an example of a configuration of a wireless communication device according to a first exemplary embodiment of the present invention.

A first exemplary embodiment of the present invention will be described in detail below with reference to the drawing. This exemplary embodiment is suitable for a case in which there is no space to install a plurality of built-in antennas in a device, a case in which it is difficult to ensure a space for additionally installing the built-in antenna, or the like in a multi-antenna technique that uses a space diversity of a wireless channel. In this exemplary embodiment, the reliability of the transmission and reception data can be improved or the high transmission rate can be realized by the use of the antenna incorporated in the slave communication terminal connected to the master communication terminal by the master communication terminal without adding the antenna. In this case, k antennas (k is zero or more and k is different for each slave communication terminal) among a plurality of antennas incorporated in each terminal of the slave communication terminals are selected and a configuration in which a part of or all signal processing functions that relate to transmission and reception of the selected antenna can be controlled by the master communication terminal is used.

FIG. 1 is a block diagram showing an example of a configuration of the wireless communication device according to the exemplary embodiment. In FIG. 1, a symbol of "10" indicates a master portable terminal (communication terminal), and a symbol "40" indicates a slave portable terminal (communication terminal). The function of the master portable terminal 10 is similar to that of the slave portable terminal 40. The master portable terminal 10 and the slave portable terminal 40 have the MIMO function conforming to a predetermined wireless standard and can communicate with the base station (not shown in FIG. 1) which incorporates the MIMO function. FIG. 1 shows an example in which each portable terminal incorporates two antennas therein. Further, a portable telephone set is an example of the portable terminal.

The relationship between the master portable terminal 10 and the slave portable terminal 40 will be described. For example, in a case in which friends or the family have a plurality of portable terminals that have a similar function, the plurality of portable terminals are connected to each other, one of the portable terminals is designated as the master portable terminal 10, and the remaining portable terminals are designated as the slave portable terminal 40.

For example, a certain person designates one's own portable terminal as the master portable terminal 10, borrows the portable terminal from the friend, the family, or the like, and connects it to the one's own master portable terminal 10 as the slave portable terminal 40. In this case, as described later, a configuration in which the master portable terminal 10 can control the slave portable terminal 40 is established and the master portable terminal 10 controls the slave portable terminal 40 to share a signal processing for transmission and reception with the slave portable terminal 40.

Further, in the exemplary embodiment, a protocol for call connection is performed only between the base station and the master portable terminal 10. Accordingly, the base station recognizes that it communicates with only the master portable terminal 10 without recognizing the existence of the slave portable terminal 40 although the base station uses the antenna of the slave portable terminal 40 for the communication.

The function confirmation of the slave portable terminal 40 is performed as follows. The master portable terminal 10 transmits a function improvement request to the base station and the base station gives the master portable terminal 10 the authority to investigate the function of the other portable terminals. The master portable terminal 10 investigates the function of the slave portable terminal 40 based on the given authority. As a result of the investigation, when it is determined that the function can be improved, the master portable terminal 10 informs the base station of function improvement information. The function improvement information includes for example, information indicating that the function of the master portable terminal 10 has been improved to a 4×4 MIMO function.

In FIG. 1, an example in which one master portable terminal 10 and one slave portable terminal 40 are included and both are connected to each other is shown. However, the configuration is not limited to this. A configuration in which the number of all portable terminals is n (n is an integer of 3 or more), one of them is designated as the master portable terminal 10, and the remaining two or more portable terminals are designated as the slave portable terminals can be used. Further, for example, any one of a daisy chain connection like a string of beads, a one-to-many connection, and a connection using both the daisy chain connection and the one-to-many connection together can be used for the connection of these plurality of portable terminals. Control data used when the master portable terminal 10 controls the slave portable terminal 40 and a baseband signal pass through an interface between the portable terminals.

The master portable terminal 10 is composed of a CPU (Central Processing Unit) 11 (control means), a digital baseband circuit 12, RF (Radio Frequency) circuits 13 and 14, antennas 15 and 16, an I/F (InterFace) circuit 17, a Data Bus 18, a Control Bus 19, and the like. A configuration of the slave portable terminal 40 is the same as that of the master portable terminal 10. Although the codes are different from each other, the slave portable terminal 40 is composed of a CPU 41 (control means), a digital baseband circuit 42, RF circuits 43 and 44, antennas 45 and 46, an I/F circuit 47, a Data Bus 48, a Control Bus 49, and the like. For example, a high-speed serial interface with k lines (k is an integer of 2 or more) can be used for the interface of the I/F circuits 17 and 47. A USB (Universal Serial Bus) or a PCI (Peripheral Components Interconnect bus) Express is an example of the high-speed serial interface.

First, a signal flow of an uplink (direction from the portable terminal to the base station) in a wireless communication device in which two portable terminals shown in FIG. 1 are connected to each other will be described. In the master portable terminal 10, a payload (user data) from an upper layer is inputted via the CPU 11 and supplied to the digital baseband circuit 12 via the Data Bus 18. The digital baseband circuit 12 performs processes such as channel coding, data separation for each antenna, a modulation process, spatial multiplexing for the multi-antenna technique, and the like.

An output signal that has been processed by the digital baseband circuit 12 is inputted to the RF circuits 13 and 14. The RF circuits 13 and 14 perform processes such as filtering, conversion into a carrier frequency, signal amplification, and the like. The outputs of the RF circuits 13 and 14 are emitted from the antennas 15 and 16 to the space as an electromagnetic wave.

Next, a signal flow of a downlink (direction from a portable base station to the terminal) in the wireless communication device in which two portable terminals shown in FIG. 1 are connected to each other will be described. The electromagnetic wave outputted by the antenna (not shown) of the base station is inputted to the RF circuits 13 and 14 via the antennas 15 and 16, respectively. The RF circuits 13 and 14 perform processes such as low noise amplification, synchronous detection, filtering, and the like. The outputs of the RF circuits 13 and 14 are inputted to the digital baseband circuit 12.

The digital baseband circuit 12 performs processes such as estimation of each channel by using the multi-antenna technique, separation of a spatially-multiplexed signal, a demodulation process, combining of data that are divided for each antenna, channel decoding, and the like. The output of the digital baseband circuit 12 is sent from the Data Bus 18 to the upper layer via the CPU 11. The CPU 11 controls the digital baseband circuit 12, the RF circuits 13 and 14, and the I/F circuit 17 via the Control Bus 19. The I/F circuit 17 is connected to the Data Bus 18 and the digital baseband circuit 12.

The slave portable terminal 40 performs the process that is similar to the process performed by the master portable terminal 10 in the uplink and the downlink. The master portable terminal 10 transmits/receives the control data and the data of each process of the digital baseband circuit 12 to/from the slave portable terminal 40 via the I/F circuit 17 and the I/F circuit 47.

Figure 2:
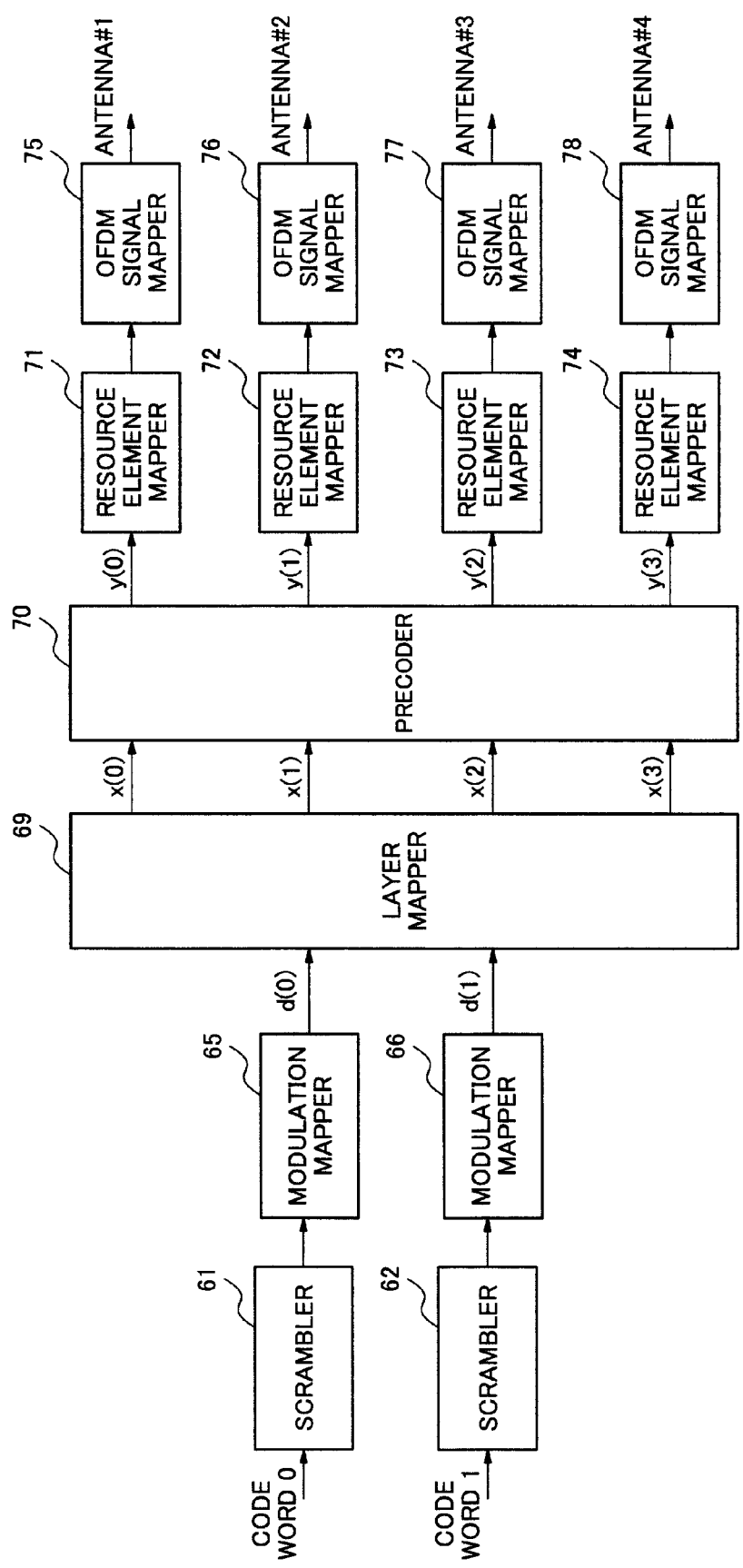
FIG. 2 is a figure for explaining a baseband signal generation procedure at the time of a downlink transmission of MIMO in LTE.
Figure 3:
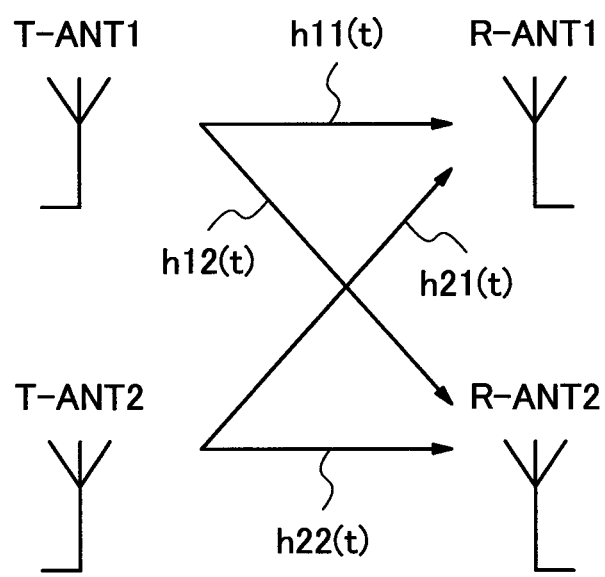
FIG. 3 is a figure for explaining the operating principle of MIMO.

Next, operation of downlink transmission in MIMO will be described. FIG. 2 is a figure for explaining a baseband signal generation procedure at the time of the downlink transmission of MIMO in LTE. In the following description, a case in which the signal is transmitted from four antennas is taken as an example. FIG. 2 shows a process performed in the base station side device (not shown) and shows the processes from a process after channel coding to a process before the process performed by the RF circuit. Further, this process is specified by non-patent document 1.

After channel coding being performed, the generated code word 0 and code word 1 are inputted to scramblers 61 and 62 and randomized, respectively. Each output of the scramblers 61 and 62 is inputted to modulation mappers 65 and 66, and modulated by using any one of modulation schemes: QPSK, 16QAM, and 64QAM. In the above description, QPSK is an abbreviation of "Quadrature Phase Shift Keying". QAM is an abbreviation of "Quadrature Amplitude Modulation". Two modulation symbol sequences d(0) and d(1) that are the outputs of the modulation mappers 65 and 66 are inputted to a layer mapper 69. The layer mapper 69 divides the two modulation symbol sequences d(0) and d(1) into four modulation symbol sequences x(0), x(1), x(2), and x(3).

The four modulation symbol sequences x(0), x(1), x(2), and x(3) are inputted to a precoder 70. The precoder 70 performs precoding (process for performing at least spatial multiplexing) to the four modulation symbol sequences x(0), x(1), x(2), and x(3), and outputs four modulation symbol sequences y(0), y(1), y(2), and y(3) to which the precoding has been performed. For example, by performing a conversion of $[y(0)\ y(1)\ y(2)\ y(3)]^T = W \cdot [x(0)\ x(1)\ x(2)\ x(3)]^T$, the precoder 70 obtains the modulation symbol sequences y(0), y(1), y(2), and y(3) to which the precoding has been performed. In the above equation, W indicates a precoding matrix with four rows and four columns and T means transposition of a matrix.

The four modulation symbol sequences y(0), y(1), y(2), and y(3) to which the precoding has been performed are inputted to resource element mappers 71, 72, 73, and 74, respectively. In each of the resource element mappers 71, 72, 73, and 74, each of the four modulation symbol sequences y(0), y(1), y(2), and y(3) to which the precoding has been performed is mapped to a resource element (subcarrier) to which an insertion position has been determined in a frequency-time domain in advance. Respective outputs of the resource element mappers 71, 72, 73, and 74 are converted into OFDM sequences by OFDM (Orthogonal Frequency Division Multiplexing) signal mappers 75, 76, 77, and 78, respectively. The respective outputs of the OFDM signal mappers 75, 76, 77 and 78 are sent to the RF circuits of the respective antennas. This signal generation is performed in the base station device (not shown), and the signals are converted into the same desired carrier frequency by the respective RF circuits and transmitted from four antennas of the base station by using the electromagnetic wave.

Operation of the wireless communication device of the exemplary embodiment will be described below. Namely, the operation of the wireless communication device in which two portable terminals are connected through the interfaces through which the control data and the user data are transmitted and received as shown in FIG. 1 will be described.

First, operation in which the above-mentioned wireless communication device receives the downlink signal from the base station will be described. Specifically, a case in which the signal transmitted by the base station is received by four antennas, that are two antennas of the master portable terminal 10 and two antennas of the slave portable terminal 40, will be described.

In this case, the wireless communication device performs a reception process. Therefore, a direction of a flow of the processes from a process after the process performed by the RF circuit to a process before channel decoding that are performed in the master portable terminal 10 and the slave portable terminal 40 is reverse to the direction of the flow of the processes shown in FIG. 2. As mentioned above, the signals transmitted from the four antennas of the base station are received by the antennas 15 and 16 of the master portable terminal 10 and the antennas 45 and 46 of the slave portable terminal 40, respectively.

The digital baseband circuit 12 of the master portable terminal 10 performs the demodulation process of two modulation symbol sequences y(0) and y(1) received by the antennas 15 and 16 of the master portable terminal 10.

The CPU 11 of the master portable terminal 10 instructs the CPU 41 of the slave portable terminal 40 to perform the demodulation process of two modulation symbol sequences y(2) and y(3) received by the antennas 45 and 46 of the slave portable terminal 40 and supplies a required parameter. Further, the instruction and the transmission of the parameter from the master portable terminal 10 to the slave portable terminal 40 are performed via the Control Bus 19, the I/F circuit 17, the I/F circuit 47, and the Control Bus 49. The CPU 41 of the slave portable terminal 40 instructs the digital baseband circuit 42 and the RF circuits 43 and 44 to perform the demodulation process of the two modulation symbol sequences y(2) and y(3) via the Control Bus 49.

The two modulation symbol sequences y(0) and y(1) are obtained by the demodulation process of the digital baseband circuit 12 of the master portable terminal 10. On the other hand, the two modulation symbol sequences y(2) and y(3) are obtained by the demodulation process of the digital baseband circuit 42 of the slave portable terminal 40.

The CPU 11 of the master portable terminal 10 instructs the CPU 41 of the slave portable terminal 40 to transmit the two modulation symbol sequences y(2) and y(3). Soon, the digital baseband circuit 12 of the master portable terminal 10 obtains the two modulation symbol sequences y(2) and y(3) from the slave portable terminal 40.

The digital baseband circuit 12 of the master portable terminal 10 performs the MIMO demodulation by using the two modulation symbol sequences y(0) and y(1) obtained by the master portable terminal 10 and the two modulation symbol sequences y(2) and y(3) obtained from the slave portable terminal 40 and obtains the four modulation symbol sequences x(0), x(1), x(2), and x(3). Further, the digital baseband circuit 12 changes the sequence from the sequence of a reception signal point constellation of the obtained four modulation symbol sequences x(0), x(1), x(2), and x(3) to the reception bit sequence and performs a descrambling to obtain a code word 0' and a code word 1'. The digital baseband circuit 12 performs the channel decoding of the code word 0' and the code word 1' to obtain the payload (user data). The CPU 11 brings the obtained payload (user data) back via the Data Bus 18 and sends it to the upper layer.

Next, operation in a case in which the above-mentioned wireless communication device transmits the uplink signal to the base station will be described. Specifically, a case in which the transmission is performed by using the four antennas, that are two antennas of the master portable terminal 10 and two antennas of the slave portable terminal 40, will be described.

In this case, the wireless communication device performs a transmission process. Therefore, in the master portable terminal 10 and the slave portable terminal 40, the processes from a process after channel coding to a process before the process performed by the RF circuit are the same as the processes shown in FIG. 2. Accordingly, the processes other than these processes will be described below. The CPU 11 of the master portable terminal 10 controls the CPU 41 of the slave portable terminal 40 to share the signal processing for the transmission with the slave portable terminal 40 by using hardware such as the antennas 45 and 46, the digital baseband circuit 42, the RF circuits 43 and 44, and the like of the slave portable terminal 40. The signal processed by the slave portable terminal 40 is collected in the master portable terminal 10, the final processing is performed in the master portable terminal 10, and the signal is transmitted from the antennas 15 and 16 of the master portable terminal 10 and the antennas 45 and 46 of the slave portable terminal 40.

By using the first exemplary embodiment described above, by connecting a plurality of similar portable terminals to each other, the master portable terminal 10 can use hardware such as the antennas 45 and 46 which are incorporated in the slave portable terminal 40 and the digital baseband circuit 42, the RF circuits 43 and 44, and the like of the slave portable terminal 40. Accordingly, the multi-antenna technique can be extended and the reliability of the transmission and reception data can be improved and the high transmission rate can be realized without newly adding an antenna.

Moreover, because the number of the slave portable terminal 40 can be easily increased (in other words, because the number of the antenna can be easily increased), upgrade of the MIMO specification (for example, a change from 2×2 to 4×4) can be flexibly implemented.

Further, in the above mentioned description, the channel decoding of the code word 0' and the code word 1' is performed by the master portable terminal 10. However, it is not limited to this. For example, with respect to a process that can be implemented as a distributed process, the master portable terminal 10 and the slave portable terminal 40 may implement the process as the distributed process while the master portable terminal 10 and the slave portable terminal 40 perform data communication with each other.

The portable terminal can be changed from the master portable terminal 10 to the slave portable terminal 40 or from the slave portable terminal 40 to the master portable terminal 10 during communication with the base station, or even when the communication is not being performed.

As shown in FIG. 1, in the above-mentioned first exemplary embodiment, the configuration in which two portable terminals are connected to each other has been explained. However, it is not limited to this. Namely, three or more portable terminals can be connected. By this, the number of antennas can be increased, the number of spatially multiplexed layers further increases and whereby, the reliability of the transmission data can be improved and the high transmission rate can be realized further.

Needless to say, in the case of the 2×2 configuration in which the number of antennas of the transmission side is 2 and the number of antennas of the reception side is 2, the process can be performed by only the master portable terminal 10.

Further, in the case of the 2×2 configuration, the process can be performed by using one of the antennas (antenna 15 and antenna 16) of the master portable terminal 10 and one of the antennas (antenna 45 and antenna 46) of the slave portable terminal 40. By this, a distance between the antennas can be increased. Therefore, high diversity effect can be obtained in comparison with a case in which the process is performed by one portable terminal and the reliability of the transmission data can be further improved.

Second Exemplary Embodiment

A wireless communication device according to a second exemplary embodiment of the present invention connects a plurality of communication terminals that have a similar function via an interface, designates any one of the communication terminals as a master communication terminal, and designates the remaining communication terminals as slave communication terminals. The master communication terminal is configured so that the master communication terminal can control a plurality of antenna elements which are incorporated in each of the slave communication terminals and a part of or all signal processing functions for a signal that relates to transmission and reception of the antenna elements and whereby, a configuration in which the number of antennas can be arbitrarily increased is implemented.

By using the exemplary embodiment, the plurality of antenna elements incorporated in the slave communication terminal and a part of or all the signal processing functions for the signal that relates to the transmission and reception of the antenna elements can be used, the number of spatially multiplexed layers increases without adding the antenna element, and whereby, the reliability of the transmission and reception data can be further improved or the high transmission rate can be realized.

The first and second exemplary embodiments described above can be suitably used for in particular, 3GPP LTE, mobile WiMAX, wireless LAN (IEEE 802.11n) or the like to which the multi-antenna technique is applied.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2009-208040, filed on Sep. 9, 2009, the disclosure of which is incorporated herein in its entirety by reference.

DESCRIPTION OF SYMBOL 10 master portable terminal
11 CPU
12 digital baseband circuit
13, 14 RF circuit
15, 16 antenna
17 I/F circuit
18 Data Bus
19 Control Bus
40 slave portable terminal
41 CPU
42 digital baseband circuit
43, 44 RF circuit
45, 46 antenna
47 I/F circuit
48 Data Bus
49 Control Bus
61, 62 scrambler
65, 66 modulation mapper
69 layer mapper
70 precoder
71 to 74 resource element mapper
75 to 78 OFDM signal mapper

The invention claimed is:

1. A wireless communication device which has a Multi-Input Multi-Output (MIMO) function conforming to a predetermined wireless standard, comprising:
   a plurality of communication terminals that communicate with a base station incorporating the MIMO function, the communication terminals being comprised of
      a master communication terminal, and
      one or more slave communication terminals, other than the master communication terminal, connected to the master communication terminal via a predetermined connection unit,
   wherein, for each of said communication terminals,
      i) a part of or all signal processing functions that relate to transmission and reception of antennas incorporated in the one or more slave communication terminals are controlled from the master communication terminal such that the antennas of the one or more slave communication terminals are available for use by the master communication terminal,
      ii) each of the antennas incorporated in the communication terminals transmits or receives a different modulation symbol sequence, and communicates with said base station using the MIMO function, and
      iii) a protocol for call connection is performed only between the base station and the master communication terminal, and
   wherein the base station communicates with the master communication terminal without recognizing an existence of the one or more slave communication terminals.

2. The wireless communication device according to claim 1, wherein each one of the communication terminals has a control unit that performs a process, and the control unit of the master communication terminal orders the control unit of the one of the slave communication terminals to perform the process.

3. The wireless communication device according to claim 2, wherein the connection unit makes any one of a daisy chain connection, a one-to-many connection, and a connection using both the daisy chain connection and the one-to-many connection together.

4. The wireless communication device according to claim 3, wherein, during a call connection or when a call is connected and disconnected, at least one of i) the master communication terminal is designated to operate as a slave communication terminal and ii) one of the slave communication terminals is designated to operate as a master communication terminal.

5. The wireless communication device according to claim 2, wherein, during a call connection or when a call is connected and disconnected, at least one of i) the master communication terminal is designated to operate as a slave communication terminal and ii) one of the slave communication terminals is designated to operate as a master communication terminal.

6. The wireless communication device according to claim 1, wherein the connection unit makes any one of a daisy chain connection, a one-to-many connection, and a connection using both the daisy chain connection and the one-to-many connection together.

7. The wireless communication device according to claim 6, wherein, during a call connection or when a call is connected and disconnected, at least one of i) the master communication terminal is designated to operate as a slave communication terminal and ii) one of the slave communication terminals is designated to operate as a master communication terminal.

8. The wireless communication device according to claim 1, wherein, during a call connection or when a call is connected and disconnected, at least one of i) the master communication terminal is designated to operate as a slave communication terminal and ii) one of the slave communication terminals is designated to operate as a master communication terminal.

9. A wireless communication method for a wireless communication device which has a Multi-Input Multi-Output (MIMO) function conforming to a predetermined wireless standard and includes a plurality of communication terminals which can communicate with a base station incorporating the MIMO function, comprising:
    designating any one of the plurality of communication terminals as a master communication terminal;
    designating a communication terminal other than the master communication terminal among the plurality of communication terminals as a slave communication terminal;
    connecting the master communication terminal to the slave communication terminal via a predetermined connection unit;
    using, among the plurality of communication terminals, a configuration in which a part of or all signal processing functions that relate to transmission and reception of antennas incorporated in the slave communication terminal are controlled from the master communication terminal such that the antennas of the slave communication terminal are available for use by the master communication terminal; and
    using, among the plurality of communication terminals, a protocol wherein call connection is performed only between the base station and the master communication terminal,
    wherein, when performing the call connection, the base station communicates with the master communication terminal without recognizing an existence of the slave communication terminal, and
    wherein each of the antennas incorporated in the communication terminals transmits or receives a different modulation symbol sequence, and communicates with said base station using the MIMO function.

10. The wireless communication method according to claim 9, wherein each of the communication terminals has a control unit that causes a signal processing function to perform a process, and the control means of the master communication terminal causes the control unit of the slave communication terminal to perform the process.

11. The wireless communication method according to claim 10, wherein the master communication terminal is connected to a plurality of slave communication terminals with any one of a daisy chain connection, a one-to-many connection, and a connection using both the daisy chain connection and the one-to-many connection together.

12. The wireless communication method according to claim 10, wherein, during a call connection or when a call is connected and disconnected, the master communication terminal is designated to perform as a slave communication terminal or the slave communication terminal is designated to perform as a master communication terminal.

13. The wireless communication method according to claim 9, wherein the master communication terminal is connected to a plurality of slave communication terminals with any one of a daisy chain connection, a one-to-many connection, and a connection using both the daisy chain connection and the one-to-many connection together.

14. The wireless communication method according to claim 13, wherein, during a call connection or when a call is connected and disconnected, the master communication terminal is designated to perform as a slave communication terminal or the slave communication terminal is designated to perform as a master communication terminal.

15. The wireless communication method according to claim 9, wherein, during a call connection or when a call is connected and disconnected, the master communication terminal is designated to perform as a slave communication terminal or the slave communication terminal is designated to perform as a master communication terminal.

* * * * *